United States Patent
Bach et al.

(10) Patent No.: US 8,634,999 B2
(45) Date of Patent: Jan. 21, 2014

(54) TECHNIQUE FOR STARTING A MOTOR VEHICLE ON A DOWNHILL ROUTE

(75) Inventors: Thomas Bach, Wolken (DE); Michael Bleser, Plaidt (DE); Harald Thelen, Oberfell (DE); Elmar Hoffmann, Meinborn (DE); Bernd Schmitt, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 434 days.

(21) Appl. No.: 12/601,369

(22) PCT Filed: May 16, 2008

(86) PCT No.: PCT/EP2008/003973
§ 371 (c)(1),
(2), (4) Date: Jun. 15, 2010

(87) PCT Pub. No.: WO2008/141781
PCT Pub. Date: Nov. 27, 2008

(65) Prior Publication Data
US 2010/0292902 A1 Nov. 18, 2010

(30) Foreign Application Priority Data
May 23, 2007 (DE) .......... 10 2007 023 928

(51) Int. Cl.
*B60W 10/04* (2006.01)
(52) U.S. Cl.
USPC .................................... 701/70; 303/192
(58) Field of Classification Search
USPC .............. 701/70, 78, 80, 83, 84, 93; 303/155–161, 192, 191, 22.8, 9.69, 303/164; 318/139

See application file for complete search history.

(56) References Cited

U.S. PATENT DOCUMENTS

| | | | |
|---|---|---|---|
| 7,092,809 B2 * | 8/2006 | Endres | 701/70 |
| 7,124,009 B2 | 10/2006 | Kustosch et al. | |
| 2002/0103583 A1 * | 8/2002 | Ohmura et al. | 701/33 |
| 2004/0254709 A1 * | 12/2004 | Kustosch et al. | 701/70 |
| 2006/0108868 A1 * | 5/2006 | Ohsaki et al. | 303/154 |
| 2007/0090691 A1 * | 4/2007 | Maskell et al. | 303/192 |

FOREIGN PATENT DOCUMENTS

| | | |
|---|---|---|
| DE | 10039458 A1 | 7/2001 |
| DE | 10248195 A1 | 4/2004 |
| DE | 10306362 A1 | 5/2004 |
| DE | 102006020164 A1 | 11/2006 |
| DE | 102005052160 A1 | 5/2007 |
| EP | 0784551 B1 | 3/1999 |
| EP | 1410940 A1 | 4/2004 |
| EP | 1424253 A1 | 6/2004 |
| EP | 1777133 A1 | 4/2007 |
| WO | 0114186 A1 | 3/2001 |
| WO | 2007025660 A1 | 3/2007 |

\* cited by examiner

*Primary Examiner* — Marthe Marc-Coleman
(74) *Attorney, Agent, or Firm* — MacMillan, Sobanski & Todd, LLC

(57) ABSTRACT

A method for starting a motor vehicle on a downhill route from an idle state includes the steps of maintaining a sufficient brake force to hold the motor vehicle in the idle state, even if brake actuation by the driver is withdrawn; detecting a wish by the driver to drive off; reducing, independently of the driver, the brake force which is maintained independently of the driver, in such a way that the resulting movement of the motor vehicle follows a preset course.

20 Claims, 4 Drawing Sheets

TECHNIQUE FOR STARTING A MOTOR VEHICLE ON A DOWNHILL ROUTE

CROSS-REFERENCE TO RELATED APPLICATIONS

This application is a national stage of International Application No. PCT/EP2008/003973 filed May 16, 2008, the disclosures of which are incorporated herein by reference, and which claimed priority to German Patent Application No. 10 2007 023 928.0 filed May 23, 2007, the disclosures of which are incorporated herein by reference.

BACKGROUND OF THE INVENTION

The invention concerns a technique for starting a motor vehicle on a downhill route. More precisely, the invention concerns a technique for braking a motor vehicle, independently of the driver, when starting from a stopped state on a downhill route.

Systems which regulate a preset speed when a downhill route is driven with a motor vehicle are known. Such systems are generally known by the name Hill Descent Control (HDC), and are often used in off-road vehicles. According to the preset speed of the motor vehicle, the deceleration of a service brake which is operated independently of the driver, and possibly also a drag torque of a drive motor, are exploited to maintain the preset speed. Additionally, for speed regulation some of these systems use sensors to determine the downhill gradient of the route.

WO 01/14186 A1 describes a method for supporting HDC regulation during starting or downhill driving. The technique described in this document includes actuation of a brake system of the vehicle, independently of the driver, on the basis of a detected speed of the vehicle and at least one external parameter which drives the vehicle.

It is a disadvantage of many of these systems that when starting on a downhill route, transient effects of the HDC regulation occur, and the driver and passengers can feel them as unpleasant. HDC systems which activate the brake independently of brake actuation by the driver require a certain time for actuation, to ensure a suitable decelerating torque. In this time, the motor vehicle can already begin to roll, so that starting regulation from the idle state is no longer possible. For the driver, this transition from the idle state to the control range of HDC regulation can give the impression of lack of feedback by the vehicle. Also, some HDC regulators first brake the motor vehicle from this movement back into the idle state, which not every driver understands. Accordingly, it would be desirable to provide an even transition between the idle state and a preset moving state when starting a vehicle on a downhill route.

BRIEF SUMMARY OF THE INVENTION

The present invention is based on the object of achieving an even transition, which mediates good control, between the idle state and a preset moving state on starting a motor vehicle on a downhill route.

According to a first aspect, a method for starting a motor vehicle on a downhill route from an idle state, the motor vehicle being held in the idle state by brake actuation, comprises the steps of maintaining, independently of the driver, a sufficient brake force to hold the motor vehicle in the idle state, detecting a wish by the driver to drive off, reducing, independently of the driver, the brake force which is maintained independently of the driver, to put the motor vehicle into motion, and controlling or regulating the movement of the motor vehicle in such a way that the movement follows a preset course.

The motor vehicle can first be held in the idle state by brake actuation by the driver, e.g. in cases in which the driver has actively braked the motor vehicle into the idle state (standstill) on the inclined route.

Alternatively, the motor vehicle can be held in the idle state by brake actuation independently of the driver. This can be the case, for instance, if a HillAssist or AutoHold system is activated, or if a different driver assistance system has actively carried out braking from movement into the idle state.

A combination of the two brake actuations is also possible, e.g. when a driver assistance system supports a driver's hesitant braking by brake actuation independently of the driver, or when the driver has actuated the brake only after the vehicle had been brought into the idle state by brake actuation independently of the driver.

The method can also include the steps of monitoring the movement of the motor vehicle with respect to a preset condition, and starting the control or regulation (e.g. the handover to an HDC system) when the preset condition occurs. Such a preset condition can be an exceeding of a speed threshold value or acceleration threshold value. For instance, the motor vehicle can roll freely up to a speed of 3 km/h, and control or regulation can be activated only when this speed is reached. In one embodiment, a once activated movement regulation of the motor vehicle remains active even when the threshold value is no longer exceeded.

The motor vehicle can originally be held in the idle state by brake actuation by the driver, and the brake force can be maintained independently of the driver when the brake actuation by the driver is withdrawn. Alternatively, brake actuation can also be generated by a system which is independent of the driver, e.g. an ABS system. In the case of a hydraulic or pneumatic brake system, the reduction of pressure in an actuator which actuates one or more wheel brakes can be prevented.

The preset course of the movement can be a movement course of the motor vehicle over time. A preset movement course over time can be preset for each of a series of instants of the course by a speed or acceleration of the motor vehicle.

The preset course can be a speed course. For instance, such a course can be preset by the driver presetting a speed to be regulated. A speed course can be put together out of multiple partial courses of different speeds.

The preset course can also be an acceleration course. Such a course can be determined, for instance, by a motor vehicle speed to be reached within a preset time span, or a maximum acceleration value within this time span, being preset.

The preset course can be followed under brake pressure control. This is possible, in particular, if the brake system has a hydraulic or pneumatic actuation mechanism. In this case, acceleration of the motor vehicle can be achieved by reduced or absent brake pressure, whereas deceleration can be achieved by increased brake pressure.

The motor vehicle can have a hydraulic brake system, and maintenance of the brake force can be achieved by closing at least one valve, which prevents reduction of a hydraulic pressure, which generates the sufficient brake force, in the hydraulic brake system. The prevailing hydraulic pressure can thus be "locked in". The locked-in hydraulic pressure in the hydraulic brake system can be generated by the driver or independently of the driver.

The driver-independent reduction of the brake force, which is maintained independently of the driver, can take place from the idle state of the motor vehicle. The idle state, which exists at the start of the method, of the motor vehicle can therefore be retained until according to the method, independently of the driver, the previously maintained brake force is reduced.

The invention can include the steps of detecting a driver's wish to accelerate, and subsequently changing a preset movement course. The driver can express his or her wish by actuating a switch or button which is provided for the purpose. Alternatively, the driver's wish can be deduced from values which are taken from controls of the motor vehicle, e.g. displacement or actuation of an accelerator pedal. On detecting the driver's wish to accelerate, usually a final speed of a preset speed course is raised, or an acceleration phase which precedes the final speed is adjusted, or an additional acceleration phase is inserted.

Execution of the method can require fulfillment of one or more conditions which indicate the usability of driver-independent movement regulation. These include, for instance, the downhill gradient of a route, the actuation of a system which executes the method, and the readiness of all required equipment for operation. If not all required criteria correspond to their setpoint values, execution of the method can be prevented or aborted, and/or a substitute method can be executed.

Brake actuation by the driver can always be given precedence over reduction of the brake force independently of the driver. In the case of a hydraulic brake system, it is possible to ensure that a brake pressure which acts effectively on a number of wheel brakes is never less than a brake pressure which the driver requests.

The preset movement course can be changeable during the execution of the method. For instance, a change of the preset movement course can take place if the driver influences the brake, the accelerator pedal or a speed regulation system (e.g. a cruise control or HDC system) of the motor vehicle, e.g. because the downhill gradient of the route changes. In one embodiment, the preset movement course is adapted, independently of the driver, to conditions of the movement of the motor vehicle, e.g. to a change of the gradient of the route or a sensed changed property of the ground. In particular, if a preset movement course is impossible or difficult to follow, the movement course can be adapted. A coupling signal of a drive motor can also influence a preset movement course.

The preset movement course can include an (optional) acceleration phase and a subsequent phase of maintaining a preset speed. At least in the phase of maintaining the preset speed, HDC regulation can be activated.

The brake force can be maintained using components of a device for electronic stability control (ESC). The brake force can also be maintained using components of an anti-lock braking system (ABS). The anti-lock braking system can itself be part of a device for electronic stability control. The components can include valves, pumps etc.

Detecting a driver's wish to drive off can include detecting a defined withdrawal of brake actuation by the driver. This minimal brake actuation can be an actuation value of, for instance, under 50%, or near or equal to zero. To determine the brake actuation, a travel or force sensor on a brake pedal, or a pressure sensor in a hydraulic brake system, can be provided.

The maintained brake force can be reduced taking account of the downhill gradient of the route. Thus in the case of a steeply downhill route, the maintained brake force can be greater than in the case of a shallowly downhill route.

According to yet another aspect, the invention includes a computer program product, with program code means for executing this method when the computer program product runs on a processing unit (e.g. a control unit). The computer program product can be stored on a computer-readable data medium.

According to a further aspect, a device for starting a motor vehicle on a downhill route from an idle state, the motor vehicle being held in the idle state by brake actuation, can comprise a device for maintaining, independently of the driver, a sufficient brake force to hold the motor vehicle in the idle state, a device for detecting a wish by the driver to drive off, a device for reducing, independently of the driver, the brake force which is maintained independently of the driver, to put the motor vehicle into motion, and a device for controlling or regulating the movement of the motor vehicle in such a way that the movement follows a preset course.

This device can include a device for detecting a measured value representing the downhill gradient of the route. This device can be implemented by an inclination sensor or inclinometer, for instance. Alternatively, a signal, representing a downhill gradient of the route, from another system which is installed in the vehicle, e.g. an HDC system, can be used.

Other advantages of this invention will become apparent to those skilled in the art from the following detailed description of the preferred embodiments, when read in light of the accompanying drawings.

DETAILED DESCRIPTION OF THE INVENTION

The downhill gradient of a route in the meaning of this document is always to be understood in the direction of travel, or in the direction of an expected movement of a motor vehicle. If the motor vehicle moves backwards, again the downhill gradient of the route in the direction of travel (i.e. backwards) is meant.

Figure 1:
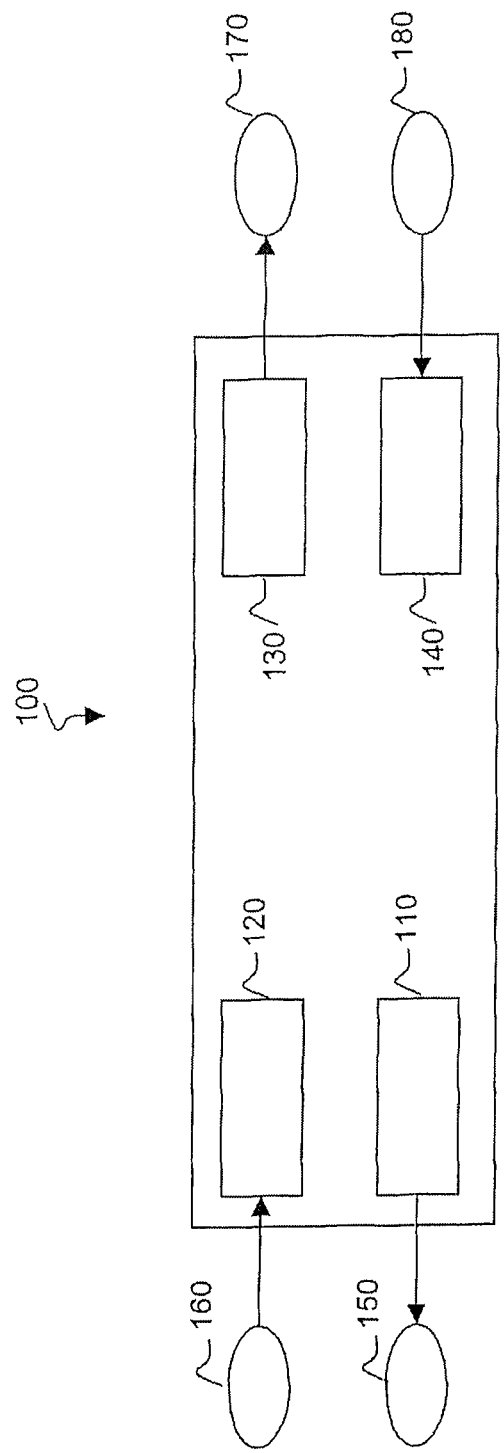
FIG. 1 shows an embodiment of a device for starting a motor vehicle on a downhill route from an idle state.

FIG. 1 shows a device 100 for starting a motor vehicle on a downhill route from an idle state. The device 100 includes a device 110 for maintaining, independently of the driver, a required brake force to hold the motor vehicle in the idle state (even, or in any case also, if brake actuation by the driver is withdrawn), a device 120 for detecting a wish by the driver to drive off, a device 130 for reducing, independently of the driver, the brake force which is maintained independently of the driver, and a device 140 for controlling or regulating the movement of the motor vehicle in such a way that the resulting movement follows a preset course.

The device 110 for maintaining a brake force is connected in the embodiment according to FIG. 1 to an actuator 150, which acts on the brake system of the motor vehicle. The transmission of data and/or signals between the device 110 and the actuator 150 can make use of an infrastructure which is generally present in the motor vehicle. For instance, an analogue or digital data bus of the motor vehicle can be used. A preferred connection includes a CAN bus. Conventional connection, e.g. in the form of electrical lines, is also possible.

In principle, these variants of transmission of measurement and control values concern all information connections which are mentioned in the embodiments.

According to one embodiment, the actuator 150 includes at least one solenoid valve which can be actuated electrically, and which influences the flow of hydraulic fluid in a hydraulic brake system. The solenoid valve can also allow partial opening or closing. In this embodiment, an activated actuator 150 prevents the flow of hydraulic fluid from one or more wheel brakes, so that a hydraulic pressure which is generated in the stopped state of the motor vehicle, e.g. by the driver, is maintained. Multiple actuators 150, which can be assigned to individual wheel brakes and controlled by the device 110 with the same effect, can also be provided. To increase safety, it can be provided that despite an activated actuator 150 the flow of hydraulic fluid into a wheel brake is made possible.

The device 110 can include a separate device for determining brake actuation by the driver, and in particular withdrawal of it (or be coupled with the device 120 for this purpose). In the embodiment, if withdrawal of the brake actuation by the driver is detected, maintenance of sufficient brake force, independently of the driver, to hold the vehicle in the idle state, is initiated. For this purpose, as described above, at least one valve in the hydraulic circuit can be closed.

To determine the brake actuation by the driver, the device 110 can be connected to one or more measuring devices (not shown). Such a measuring device is designed, in one embodiment, to supply a signal which is proportional to the brake actuation by the driver. This measuring device can be provided, for instance, near a brake pedal, which the driver actuates to brake the motor vehicle. In one embodiment, this measuring device is a travel or force sensor, which is mounted on the brake pedal, so that a movement of the brake pedal or an introduction of force into the brake pedal is determined by the sensor. Alternatively, a pressure sensor, which picks up the prevailing pressure in a hydraulic brake system (e.g. in the master brake cylinder), can also be used for the measuring device.

If a signal representing brake actuation by the driver is already present in another system installed in the motor vehicle, this signal too can be used by the device 110, after the signal has been prepared if required. For instance, preparation can include conversion from an analogue to a digital signal. In another variant, conversely, conversion from a digital to an analogue signal is required. Conversion between different data formats of analogue or digital representation can also be required.

The device 110 can also include a device to determine a sufficient (or necessary) brake force to hold the motor vehicle in the idle state. For this purpose, a further measuring device (not shown), which determines the gradient of the route, can be connected to the device 110. From this value, for instance, taking account of a known or estimated total mass of the motor vehicle, a required brake force can be determined. It is also possible to ascertain a maximum brake force which is sufficient, in all conditions to be assumed, to hold the motor vehicle in the idle state. The device for determining a sufficient brake force to hold the motor vehicle in the idle state can co-operate with the device to determine withdrawal of the brake actuation by the driver, to ensure that the maintenance of the brake force independently of the driver is initiated early enough to prevent the vehicle beginning to roll.

The device 120 for sensing a wish by the driver to drive off can be connected to a measuring device 160. The measuring device 160 can, for instance, detect the position of a brake or accelerator pedal, or a hydraulic brake pressure. Alternatively, the measuring device 160 can also be implemented in the form of an element which the driver can operate, e.g. a switch or button. In a further embodiment, multiple influencing determining factors can be combined with each other, to determine a driver's wish to drive off. In one embodiment, the driver's wish to drive off is recognized by actuation of a brake pedal by the driver being compared with a preset value. If the detected actuation of the brake pedal is less than the preset value, a driver's wish to drive off is registered. Preferably, as the preset value, a value which is near or equal to full omission of actuation of the brake pedal by the driver is used.

The device 130 for reducing a brake force which is maintained independently of the driver can be part of a speed regulation system (e.g. an HDC system) and connected to an actuator 170, which is suitable for reducing a brake force which is present at a brake system. The actuator 170 can also be the actuator 150 or an element combined with the actuator 150. In a variant, a combined actuator 150/170 is a solenoid valve arrangement which can be actuated electrically, in a non-activated state allows a free flow of hydraulic fluid into and out of a wheel brake, and in an activated state prevents a flow.

The device 140 for controlling or regulating the movement of the motor vehicle can include a device for determining a movement of the motor vehicle. For this purpose, the device 140 can also be connected to a measuring device 180. Common measuring devices include wheel speed sensors, which for instance measure inductively, capacitively, resistively or optically. In one embodiment, the device 140 is connected to a system which is installed in the motor vehicle, and which captures the movement of the motor vehicle autonomously. Such a system can be implemented in the form of an ABS system, determine the movement of the motor vehicle relative to the route on the basis of measured values of one or more wheel speed sensors, and make it available to the device 140. Additionally or alternatively, this determination can include the processing of further measured values, e.g. those of a navigation system or another system installed in the motor vehicle.

Finally, the device 140 can include a device for specifying a movement course. Such devices are generally known from speed regulation systems (e.g. HDC systems). The devices for reducing a brake force which is maintained independently of the driver, for determining the motor vehicle movement, and for specifying a movement course can work together in such a way that the determined movement is continuously compared with the specified movement, and the brake force which is maintained independently of the driver is reduced depending on this comparison.

Figure 2:
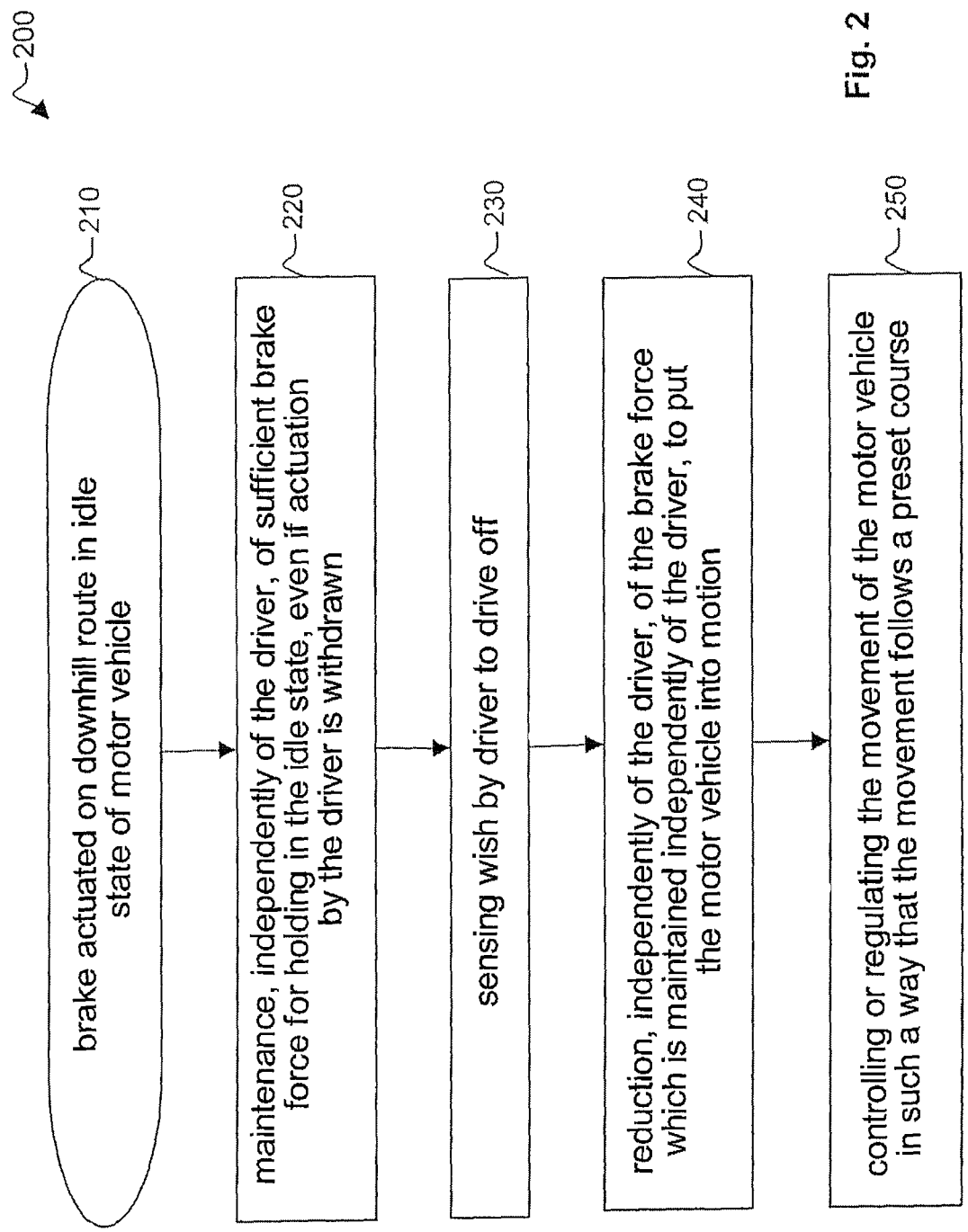
FIG. 2 shows steps of a method according to an embodiment for starting a motor vehicle on a downhill route from an idle state.

FIG. 2 shows an embodiment of a method 200 of braking a motor vehicle independently of the driver when starting on a downhill route from an idle state, the motor vehicle being held in the idle state at first by brake actuation by the driver or independently of the driver. The method can be executed by the device shown in FIG. 1, or a device in another form.

In step 210, a motor vehicle is in the idle state on a downhill route. The brake of the motor vehicle is actuated, to hold the motor vehicle in this idle state. The brake force exceeds the downhill slope force on the motor vehicle.

In step 220, independently of the driver, a necessary brake actuation to hold the motor vehicle in the idle state is maintained, even or in particular when brake actuation by the driver is withdrawn. For this purpose, withdrawal of brake actuation by the driver can be detected first. Depending on the situation, withdrawal of brake actuation by the driver can be carried out at different speeds. Maintenance of the required brake actuation can include complying with a maximum preset speed. Alternatively, depending on the situation, a necessary brake force for holding in the idle state can be determined, and undershooting it can be prevented. This determination can include detecting a signal representing the downhill gradient of the route on which the motor vehicle is. In this way, on a slight gradient the maintained brake force can be relatively small, whereas on a steep gradient, a large brake force is maintained.

In step 230, a wish by the driver to drive off is detected. In one embodiment, this detection consists of determining the driver-controlled actuation of a brake pedal, or the brake pressure which the driver is currently generating, and comparing it with a preset value. The preset value can correspond to partial or full omission of actuation of the brake pedal. In one embodiment, the preset comparison value is slightly above the completely omitted brake actuation, i.e. at a still minimal actuation of the brake by the driver. Alternatively, detecting the driver's wish to drive off can be determined by checking whether the driver actively actuates an actuation element to express his or her wish. For instance, such an actuation element can be a switch or button which is provided near the driver. In a further variation, a switch can be provided on the accelerator pedal, and a driver's wish to drive off can be registered if the driver merely taps the accelerator pedal, for instance. In a further embodiment, a signal of another driver assistance system, a clutch engagement signal, an engine drive torque or a parameter derived from it can be detected to determine the driver's wish to drive off.

To comply with the driver's wish to drive off, in step 240 the brake force which is maintained independently of the driver is reduced independently of the driver. In one embodiment, the maintained brake force is reduced gradually, e.g. in the case of a hydraulic brake system by reducing the associated brake pressure to a controlled extent (e.g. according to a falling slope). For instance, for this purpose an escape of hydraulic fluid from one or more wheels brakes can be controlled. If the method is used with an electrical brake system, for instance, preferably the electrically initiated brake actuation is similarly slowly withdrawn. An even withdrawal of a maintained brake actuation is not possible in all cases, e.g. if a wedge brake is used. In such cases, abrupt reduction of the maintained brake actuation can be necessary, and is comprised by the method.

In step 250, the movement of the motor vehicle is controlled or regulated in such a way that the movement follows a preset course. For this purpose, this step can include determination of the movement of the motor vehicle, and/or complete HDC regulation. The regulating mechanism can work according to any method which is known in the prior art, e.g. as a PID regulator or one of its variants, or as a fuzzy regulator. Step 250 can include a substep, which is carried out following step 240, of monitoring the resulting movement of the motor vehicle with respect to a preset condition. This preset condition can be exceeding a speed threshold value or acceleration threshold value. If the fulfillment of this condition is detected, acceleration or speed regulation (e.g. HDC regulation) is started in a subsequent substep.

Figure 3:
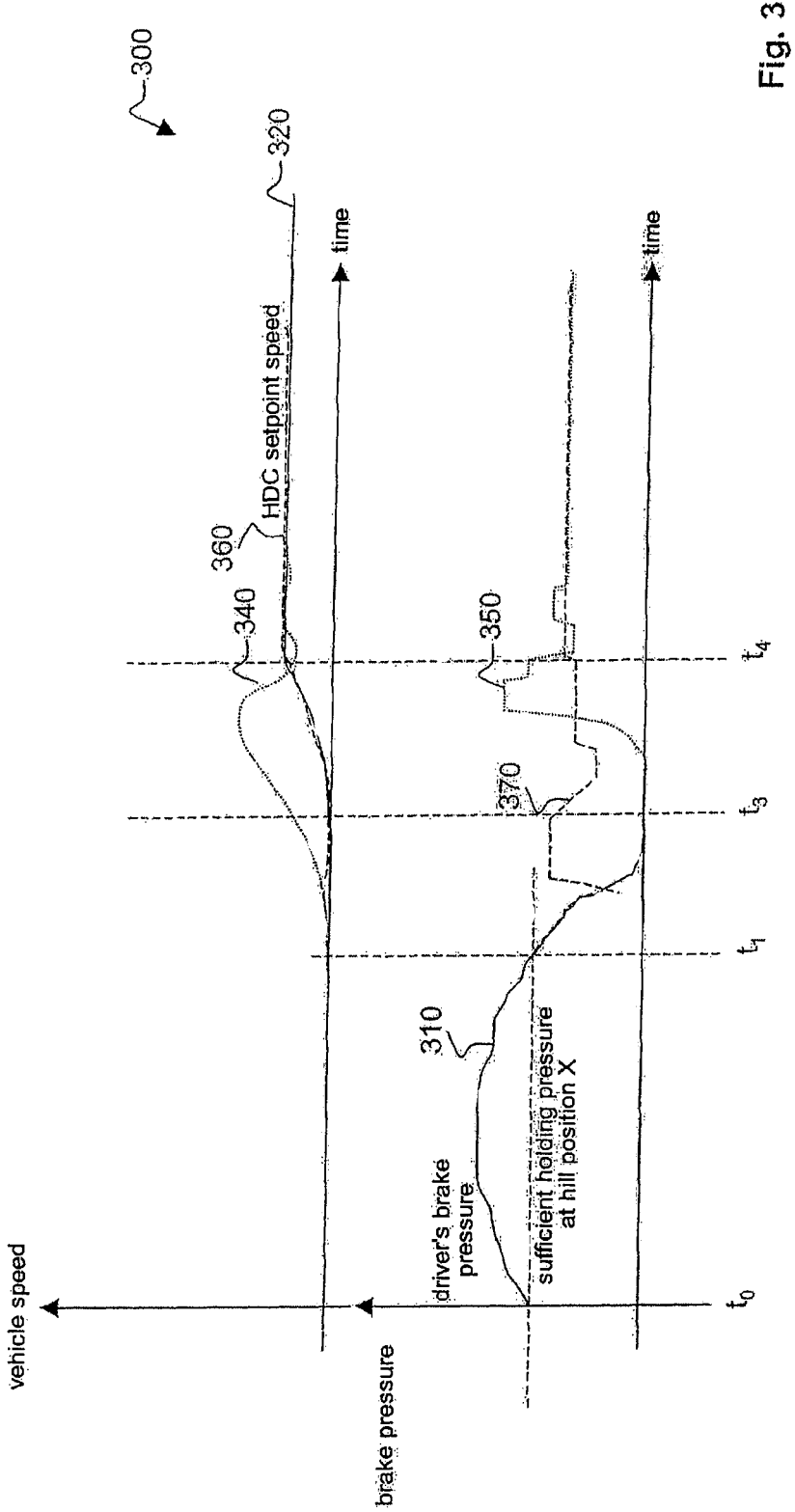
FIG. 3 shows exemplary courses of brake pressures and speeds of a motor vehicle when a motor vehicle is started on a downhill route from an idle state according to the prior art.
Figure 4:
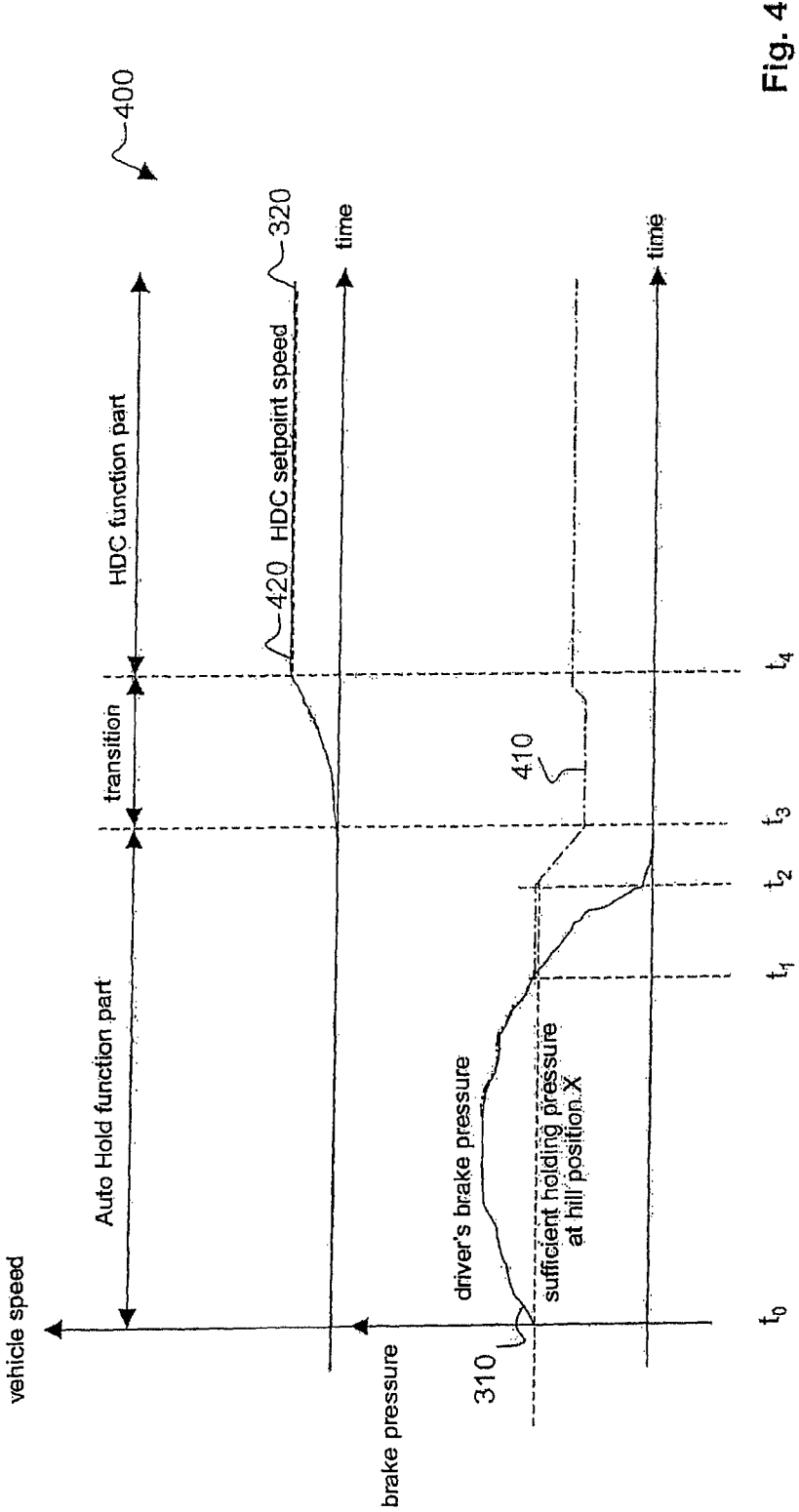
FIG. 4 shows the courses of brake pressure and speed of a motor vehicle in an embodiment, when a motor vehicle is started on a downhill route from an idle state.

FIGS. 3 and 4 show courses of brake pressures and speeds of a motor vehicle when starting on a downhill route. As explained above, a preset course of a speed is a possible form of a preset course of a movement. FIGS. 3 and 4 should therefore be seen as an example form of the present invention.

In the top part of each diagram, the speeds of the motor vehicle are shown, whereas in the bottom part brake pressures are shown. In both figures, a hydraulic brake system is assumed. Representing the brake actuation by the driver, in the bottom parts of FIGS. 3 and 4 a brake pressure 310 caused by the driver is shown as a continuous line in the left-hand part of the representation. In this embodiment, maintenance of a brake force is represented by corresponding maintenance of a brake pressure in the hydraulic brake system. From instant $t_0$, the brake pressure caused by the driver runs above a minimum pressure which is required to hold the motor vehicle in the idle state. This value is undershot at instant $t_1$. Until this instant, the speed of the motor vehicle is zero in all variants. In the right-hand top part of the diagrams of FIGS. 3 and 4, a preset speed course 320 (HDC setpoint speed) is drawn in the form of a continuous line.

In FIG. 3, two different speed and brake pressure courses are shown according to regulating devices of the prior art. The dotted line 340 represents the course of a speed of a motor vehicle which is driven out of the idle state on a downhill route using a traditional HDC system. The dotted line 350 shows the associated brake pressure of the HDC system. The two dashed lines 360 and 370 belong to an HDC system with additional downhill starting control according to the prior art, and are described further below.

In the case of a traditional HDC system, the speed 340 of the motor vehicle rises above the zero point at time $t_1$, immediately after the driver's brake pressure 310 has fallen below the necessary pressure to hold the motor vehicle in the idle state. The HDC brake pressure 350, which is generated independently of the driver, is still zero at this instant. The speed of the motor vehicle then rises rapidly, while and after the driver's brake pressure 310 falls to zero. A maximum speed of the motor vehicle is reached between instants $t_3$ and $t_4$. This speed is far above a maximum of the speed course 320 which the driver has preset. Shortly before the speed maximum is reached, the brake pressure 350, which is generated by the HDC regulation independently of the driver, rises steeply; a strong braking effect is exerted on the motor vehicle. When a maximum brake pressure is reached, the speed of the motor vehicle falls more and more steeply. At instant $t_4$, the speed 340 has reached approximately the final speed of the preset speed course 320. With further changes of the HDC brake pressure 350, the speed 340 approaches the final speed of the preset speed course 320 in the form of a damped oscillation, and the brake pressure 350 and the speed 340 remain constant (a constant gradient is assumed here). The regulation is aperiodic because of the transient phenomena.

The speed course 360, shown by a dashed line, corresponds to the brake pressure course 370, also shown by a dashed line. Both courses belong to an HDC system with additional downhill starting control according to the prior art. In this system too, the motor vehicle begins to roll immediately after, at instant $t_1$, the driver's brake pressure 310 has fallen below the necessary pressure to hold the motor vehicle in the idle state. However, now an increase of the speed 360 of the motor vehicle between instants $t_1$ and $t_3$ is counteracted only by the HDC regulation building up the brake pressure 370 very quickly, independently of the driver, so that the speed 260 is completely or at least almost reduced back to zero (which the driver does not always understand). At instant $t_3$, the brake pressure 370 is gradually reduced, so that the speed 360 rises. The course of the brake pressure 370 is such that the speed 360, after instant $t_3$, corresponds to the preset speed course 320 to a good approximation. From approximately when the final speed is reached at instant $t_4$, the courses of the brake pressure 370 and speed 360 are constant.

The graph 400 in FIG. 4 shows the course of the brake pressure 410 and speed 420 of the motor vehicle when a motor vehicle begins to move on a downhill slope using the device of FIG. 1 and the method according to FIG. 2. Both lines 410, 420 are drawn as dot-dash lines.

Immediately before, at instant $t_1$, the driver's brake pressure 310 falls below the necessary pressure to hold the motor vehicle in the idle state, the brake pressure 410, which until this instant has corresponded to the driver's brake pressure, is "locked into" its instantaneous value in the brake system, independently of the driver. This prevents the motor vehicle putting itself into motion and the speed 420 of the motor vehicle becoming greater than zero, as is the case with the two speed courses shown in FIG. 3. Of course the pressure could be "locked in" earlier, e.g. near the maximum value.

At instant $t_2$, the driver's wish to drive off is recognized. In the shown embodiment, for instance, this is determined by the brake pressure 310 which the driver requests (and which can be deduced from the position of the brake pedal, for instance) undershooting a threshold value at instant $t_2$. As the reaction to this event, the formerly "locked-in" brake pressure 410 is reduced continuously, independently of the driver, until at instant $t_3$ the speed 420 increases. The currently set brake pressure 410 is maintained at first. Then, shortly before, at instant $t_4$, for instance the speed 420 corresponds to the final speed which the driver requests from the HDC system, or another condition is seen as fulfilled, a transition or handover to HDC regulation occurs. Then, over the whole further course of the representation, the speed 420 corresponds to the preset speed course 320 so precisely that the two lines can hardly be distinguished from each other in the representation.

In the region between instants $t_o$ and $t_2$, the course of the brake pressure 410 corresponds effectively to that of an Auto-Hold system, which is known per se. Such a system ensures that a motor vehicle does not make an unwanted movement out of an idle state by a brake system being actuated independently of the driver. In the shown situation, for instance, there is the danger of unintended rolling beginning if, at instant $t_1$, the brake actuation by the driver is no longer enough to hold the motor vehicle in the idle state, and a drop of the brake pressure below the required value is prevented between instants $t_1$ and $t_2$.

Between instants $t_3$ and $t_4$, the shown system behaves approximately like an HDC system, which is also known per se, a speed to be reached being regulated and held by a change of the brake pressure independently of the driver. Then, from instant $t_4$, traditional HDC regulation is active.

In the illustrated embodiments, the starting method ensures a gentle yet precise transition between the AutoHold/Hill-Hold and HDC functions, by enabling the speed of the motor vehicle to follow the preset speed course precisely with relatively small and few changes of the brake pressure 410. The brake pressure 410 changes which take place are also not very steep, which further improves the transition. Overshooting the speed, which irritates the driver, or beginning to roll and braking again as shown in FIG. 3, can be effectively avoided or at least reduced. The effect of the method on the behavior of the motor vehicle is always such that an immediate feedback about his or her own actions is always provided to a driver, and an impression of a motor vehicle making itself independent is never communicated to him or her, despite the provided support.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method for starting a motor vehicle on a downhill route from an idle state, the motor vehicle being held in the idle state by brake actuation, including the following steps:

maintaining, independently of the driver, a sufficient brake force to hold the motor vehicle in the idle state before a wish of the driver to drive off is detected;

detecting a wish by the driver to drive off;

reducing, independently of the driver, the brake force which is maintained independently of the driver, to put the motor vehicle into motion, beginning with the detection of the wish by the driver to drive off; and as soon as a speed of the motor vehicle has reached a preset threshold value, controlling or regulating the speed in such a way that the speed follows a preset course.

2. The method according to claim 1, wherein the motor vehicle is originally held in the idle state by brake actuation by the driver, and the brake force is maintained independently of the driver when the brake actuation by the driver is withdrawn.

3. The method according to claim 2, wherein the motor vehicle has a hydraulic brake system, and further wherein the preset speed course is followed under hydraulic brake pressure control.

4. The method according to claim 3, wherein maintaining of the brake force is achieved by closing at least one valve to prevent reduction of a hydraulic pressure which generates the sufficient brake force in the hydraulic brake system to hold the motor vehicle in the idle state.

5. The method according to claim 4, wherein the sufficient hydraulic pressure in the hydraulic brake system was generated by the driver.

6. The method according to claim 1, wherein the driver-independent reduction of the brake force, which is maintained independently of the driver, takes place from the idle state of the motor vehicle.

7. The method according to claim 1, wherein the method further includes the steps of detecting a driver's wish to accelerate and correspondingly changing the preset course of the movement of the motor vehicle.

8. The method according to claim 7, wherein execution of the method requires fulfillment of conditions which indicate the usability of driver-independent movement regulation.

9. The method according to claim 1, wherein brake actuation by the driver is always given precedence over reduction of the brake force independently of the driver.

10. The method according to claim 1, wherein the preset speed course of the motor vehicle is changeable during the execution of the method.

11. The method according to claim 10, wherein the preset speed course of the motor vehicle includes an optional acceleration phase and a phase of maintaining a preset speed.

12. The method according to claim 1, wherein Hill Descent Control (HDC) regulation is carried out.

13. The method according to claim 1, wherein the brake force is maintained using components of a device for Electronic Stability Control (ESC).

14. The method according to claim 13, wherein the brake force is maintained using components of an Anti-lock Braking System (ABS).

15. The method according to claim 1, wherein sensing a driver's wish to drive off includes detecting a defined withdrawal of brake actuation by the driver.

16. The method according to claim 1, wherein the maintained brake force is reduced taking account of a downhill gradient of the route.

17. The method according to claim 1 further including a step of providing a processing unit and a computer program product with program code for executing the method when the computer program product code runs on the processing unit.

18. The method according to claim 17, wherein the computer program product is stored on a computer-readable data medium.

19. A system for starting a motor vehicle on a downhill route from an idle state, the motor vehicle being held in the idle state by brake actuation, the system comprising:
- a control unit that is operable to maintain, independently of the driver, a sufficient brake force to hold the motor vehicle in the idle state before a wish of the driver to drive off is detected;
- a detector that is operable to detect a beginning of a wish by the driver to drive off, with the control the control unit being responsive to the detected wish to drive off to reduce, independently of the driver, the brake force which is maintained independently of the driver, to put the motor vehicle into motion;
- a wheel speed sensor that is operable to sense that a speed of the motor vehicle reaches a preset threshold value; and
- a speed regulation system that is operable to control the speed of the motor vehicle in such a way that the speed follows a preset course when the threshold value is reached.

20. The system according to claim 19 further including a sensor that is operable to capture a measured value representing the downhill gradient of the route.

* * * * *